US006587743B1

(12) United States Patent
White et al.

(10) Patent No.: US 6,587,743 B1
(45) Date of Patent: Jul. 1, 2003

(54) PICK AND PLACE TEACHING METHOD AND APPARATUS FOR IMPLEMENTING THE SAME

(75) Inventors: William H. White, Houston, TX (US); Samuel K. Ingram, Houston, TX (US)

(73) Assignee: B P Microsystems, Inc., Houston, TX (US)

( * ) Notice: Subject to any disclaimer, the term of this patent is extended or adjusted under 35 U.S.C. 154(b) by 0 days.

(21) Appl. No.: 09/361,791

(22) Filed: Jul. 27, 1999

Related U.S. Application Data

(60) Provisional application No. 60/117,873, filed on Jan. 29, 1999, and provisional application No. 60/122,023, filed on Feb. 26, 1999.

(51) Int. Cl.[7] .............................................. G06F 19/00
(52) U.S. Cl. ........................................ 700/121; 29/740
(58) Field of Search ............................ 700/56–59, 121; 29/833, 740; 228/8–10; 318/568.13

(56) References Cited

U.S. PATENT DOCUMENTS

| | | | |
|---|---|---|---|
| 4,638,232 A | 1/1987 | Stridsberg et al. | |
| 5,003,692 A | 4/1991 | Izumi et al. | |
| 5,285,946 A | 2/1994 | Tomigashi et al. | |
| 5,384,956 A | 1/1995 | Sakurai et al. | |
| 5,400,497 A | 3/1995 | Watanabe et al. | |
| 5,447,266 A | 9/1995 | Misono | |
| 5,539,977 A | 7/1996 | Kano et al. | |
| 5,608,642 A | 3/1997 | Onodera | |
| 5,724,722 A | 3/1998 | Hashimoto | |
| 5,749,142 A | 5/1998 | Hanamura | |
| 5,758,410 A | 6/1998 | Asai et al. | |
| 5,833,591 A | 11/1998 | Abe et al. | |
| 6,298,547 B1 * | 10/2001 | Okuda et al. | 29/740 |
| 6,314,640 B1 * | 11/2001 | Yoshida et al. | 29/740 |

* cited by examiner

*Primary Examiner*—John Follansbee
*Assistant Examiner*—Edward F. Gain, Jr.
(74) *Attorney, Agent, or Firm*—Townsend and Townsend and Crew LLP; Gerald T. Gray

(57) ABSTRACT

Systems and methods for teaching a location in a device programming apparatus. The X, Y, Z and angle coordinates of a pick and place nozzle are initialized, and the nozzle is moved in the X and Y coordinates to a position above the device in the location to be taught. The new X and Y coordinates of the nozzle are stored to a memory along with the initial angle coordinate. The system automatically determines the Z location of the surface of the device. The nozzle then automatically picks up the device and performs vision centering to determine the X, Y and angle offsets with respect to the initialized coordinates. The X, Y and angle offsets are used to modify the stored X, Y and angle coordinates so as to precisely determine the X and Y location of the device center as well as the device angle with respect to the system's global reference frame.

11 Claims, 6 Drawing Sheets

PICK AND PLACE TEACHING METHOD AND APPARATUS FOR IMPLEMENTING THE SAME

CROSS REFERENCES TO RELATED APPLICATIONS

This application is related to U.S. Provisional Patent Application Ser. No. 60/117,873, filed Jan. 29, 1999, entitled "IN-LINE PROGRAMMING DEVICE WITH SELF-TEACHING CAPABILITY," and U.S. Provisional Patent Application Ser. No. 60/122,023, filed Feb. 26, 1999, entitled "PICK AND PLACE TEACHING METHOD AND APPARATUS FOR IMPLEMENTING THE SAME," the disclosures of which are each hereby incorporated by reference in its entirety.

BACKGROUND OF THE INVENTION

The present invention generally relates to automatic configuration of semiconductor device handling equipment to accommodate multiple applications and random variations among machines and devices.

In the semiconductor industry, a considerable number of electronic devices are provided by vendors in programmable form with blank memories or unspecified connections between arrays of logic. Users can then custom configure or program the electronic devices to perform their intended function by programming them, transferring or "burning in" a sequence of operating codes into the memory, or by specifying a particular arrangement of gating logic connections.

Numerous manufacturers have developed automated machinery for handling and programming such devices. Such machinery moves blank devices from a source medium (e.g., trays, tubes, etc.) to one or more programming sites, carries out the programming operation on each device, and moves programmed devices from the programming sites to an output medium (e.g., trays, tubes, etc.).

Both to allow flexible handling of a wide variety of automated programming operations (different types of input or output media, different device package types, etc.) and to account for inevitable manufacturing variations from machine to machine, it is necessary for the equipment operator to configure (or "teach") the automated programming machinery the precise locations from which to pick up devices and to which to place devices. This includes all input and output media locations, the locations of all programming site sockets, and any other such locations within the system.

Accurate teaching is critical to the robust operation of automated programming systems. While older, larger programmable devices are relatively insensitive to placement accuracy, modem fine pitch devices have very delicate leads and suffer damage unless placement operations are highly accurate (for instance, correct to within 0.001").

Not all automated equipment can achieve such accurate placement. In order to do so, high-end equipment uses a technique known as vision centering. The system picks up each device with a pick and place nozzle and holds the device in the path of a series of parallel laser beams. The device is then rotated in the path of the laser beams. A bank of sensors monitors which of the beams is interrupted during the rotation of the device. This information can be processed numerically to identify the precise angle and position of the device on the pick and place nozzle. Linear encoder technology allows the system to place the nozzle at any desired location. The results of the vision centering operation allow a correction move in the lateral horizontal (i.e., X, Y) and angle coordinates to be performed so that the part can be precisely placed at the desired location.

Traditional vision centering does not assist the user in determining the correct pick and place locations. Rather, it merely enables the system to place with extreme accuracy once those locations are specified.

While the ease with which the operator can carry out the teaching operation does not directly affect the physical treatment of devices, it does affect the efficiency of system operation. Typical users of automated programming equipment are highly sensitive to system throughput (measured in correctly programmed devices per hour) and yield (defined as the percentage of devices which are correctly programmed). Furthermore, more difficult teaching techniques require more highly trained personnel that draw higher wages. As a result of all of these considerations, automated programming equipment users prefer fast, easy teaching techniques.

A variety of teaching techniques has been implemented to date. These include none, file-controlled, trial-and-error, single point downward vision teaching, and double point downward vision teaching. Each of these techniques is characterized by advantages and disadvantages when considered in terms of accuracy and ease of use.

Some equipment requires no teaching whatsoever. This equipment is simple to set up and use, but is limited to devices that are rugged and can tolerate the relatively imprecise component placement that results from inevitable manufacturing variations from machine to machine. Such equipment is normally also limited to a specific device type or a small range of types and offers little flexibility to handle new devices.

Some equipment requires no active teaching on the part of the user, but offers improved flexibility by utilizing CAD data files to determine the location of device pick and place points. Systems of this type offer more flexible handling of a variety of jobs, but are still limited to rugged components that can tolerate relatively poor placement accuracy, because this teaching technique doesn't account for random manufacturing variations.

A wide variety of equipment is available that provides operator control over the various pick and place locations but offers no systematic technique to help the operator determine the proper settings. The operator of such equipment must pursue a trial-and-error approach until correct settings are determined. Once accurately configured, such equipment can operate very reliably, but the trial-and-error process can be very time consuming and can result in many damaged (and hence unusable) parts. Equipment of this type still normally handles only rugged devices.

Some automated device programming systems are equipped with downward vision cameras. Such a camera is mounted to the movable portion of the system and can be positioned over any point in the system workspace. The camera can "look down" on the components or component locations. The operator can observe the camera field of view on a monitor which is normally equipped with crosshairs for precise positioning. Downward vision cameras can be used in "single point" or "double point" teaching mode.

In a system that employs single point downward vision teaching, the operator positions the camera crosshairs over the estimated center of the component location to be taught and indicates via a keystroke, mouse click, or some other event that the proper position has been identified. The system then stores this position and returns to it when necessary. This approach provides better accuracy than all previously described techniques, and requires only a single camera positioning operation by the user. However, the approach requires that the operator visually estimate the proper crosshair location. This can be inaccurate unless the location being taught exhibits some kind of distinct "landmark" at the center point, which is not always the case. When such a landmark is available, systems of this type can properly handle delicate fine pitch parts, while some device damage can result in the absence of such landmarks.

Double point downward vision teaching improves upon the single point technique by allowing the user to teach two points and taking as the teach point the arithmetic average of those two points. In most systems it's much easier to find two symmetrically located "landmarks" than to find a single landmark at the precise target location. A disadvantage of this approach, however, is that the operator must position the crosshairs twice, doubling the labor involved in the teaching process. Historically, double point downward vision teaching has provided the most reliable results and has proven most successful in handling fine pitch devices.

None of the approaches described above fully exploit the fine positioning capability of modem motion control equipment. Even the most accurate of the above methods, double point downward vision teaching, requires that the operator visually align two references (the camera crosshair and the image landmark) with one another. Human vision is not capable of performing this feat to the full accuracy of motion control hardware. The approaches that do work well require extensive operator involvement and thus admit the possibility of human error.

A much more serious limitation of all existing approaches is that none of them deal effectively with angular and vertical axis coordinates. All of the approaches described above address only the lateral horizontal components of the device location. In the above approaches, angular error is normally neglected, and the vertical coordinate must be set by the operator using visual inspection of the proximity of the pick and place nozzle to the top of the device.

SUMMARY OF THE INVENTION

Briefly, the present invention provides a new and improved technique for teaching automated programming equipment that exploits the full accuracy of the system's pick and place capabilities while requiring minimal effort on the operator's part. The approach requires that the operator place a device in the location to be taught. The system then picks the device up, performs vision centering measurements on the device, and uses the results of these measurements to determine the precise place coordinates for the device. This information is stored in the system in a manner that prevents the need to perform teaching for any given combination of hardware items more than once.

The teaching process begins automatically when the system, e.g., via software, recognizes that the target coordinates associated with an imminent placement have not been initialized. The system guides the operator through the steps required to determine the proper values for all four coordinates (X, Y, Z, and angle).

First, the system displays an alert box on the computer monitor identifying the location in question and instructing the user to place a device in the location. Some locations (e.g., programming site sockets) hold the device in a very well defined position. Others (e.g., device pockets in input and output media) may allow a degree of play in the device's location. After the user has placed a device in the location, he or she must ensure that the system nozzle is roughly over the device. This subjective specification of a position by the operator does not affect the final coordinates determined by the teach process. The operator must merely be close enough to allow the system to pick the part up. When the operator is satisfied with the rough location, he or she notifies the system software to indicate permission to move to the next step.

Once the operator indicates that the vacuum nozzle is over the device, the system software takes over and begins to step the nozzle downward toward the device's upper surface. After each step the system uses a proximity sensor to determine whether the nozzle is in contact with the device. As long as the nozzle has not made contact with the device, the downward stepping process continues. Once contact is established, this part of the teaching process is complete and the vertical position of the nozzle is stored as the Z coordinate associated with the teach process for this particular location and device.

Once the Z coordinate is established, the system is capable of picking the device from its location. In one embodiment, a vacuum nozzle is used. The device is picked up by activating the vacuum nozzle while the nozzle is in contact with the device.

The system software continues the teaching process by positioning the device in the laser align beam(s) and using the vision centering process to determine the precise X, Y, and angle offsets with respect to the nozzle. The software is also able to determine the nozzle X and Y coordinates (relative to initialized X and Y axes) using linear encoder feedback. By suitably combining the encoder readings with the laser align measurement results, the system software determines the precise X and Y location of the device center as well as the device angle with respect to the system's global reference frame. When the measurement process is complete, the system places the device back in its original position.

According to an aspect of the invention, a method is provided for teaching a location in a device programming apparatus. The method typically comprises the steps of providing a device in the location to be taught, providing a nozzle capable of picking up the device, wherein the nozzle has an initial set of horizontal coordinates and an initial vertical coordinate, and positioning the nozzle to a first set of horizontal coordinates different from the initial set of horizontal coordinates such that the nozzle is above the device. The method also typically comprises the steps of automatically determining, with the nozzle, the vertical position of the device relative to the initial vertical coordinate, automatically determining, for each of the horizontal coordinates, offset coordinates of the center of the device relative to the nozzle, and combining the horizontal offset coordinates with the first set of horizontal coordinates so as to determine the location of the device relative to the initial set of coordinates.

According to another aspect of the invention, a method is provided for teaching a location in a device programming apparatus. The method typically comprises the steps of providing a device in the location to be taught, wherein the device has an associated identifier, determining whether teaching data associated with the identifier is stored in a memory; and if not, providing a nozzle capable of picking up the device, wherein the nozzle has an initial set of horizontal coordinates and an initial vertical coordinate, and positioning the nozzle to a first set of horizontal coordinates different from the initial set of horizontal coordinates such that the nozzle is above the device. The method also typically comprises the steps of automatically determining, with the nozzle, the vertical position of the device relative to the initial vertical coordinate, automatically determining, for each of the horizontal coordinates, offset coordinates of the center of the device relative to the nozzle, combining the horizontal offset coordinates with the first set of horizontal coordinates to produce teaching data that identifies the location of the device relative to the initial set of coordinates, and storing the teaching data to the memory in association with the device identifier.

According to yet another aspect of the invention, a device programming apparatus with self-teaching capability is provided. The apparatus typically comprises a nozzle assembly having a nozzle capable of picking up a device in a location to be taught, wherein the center of the nozzle has an initial set of horizontal coordinates and an initial vertical coordinate, and a means for positioning the nozzle to a first set of horizontal coordinates different from the initial set of horizontal coordinates such that the nozzle is above the device. The apparatus also typically comprises a means for automatically determining, with the nozzle, the vertical position of the device relative to the initial vertical coordinate, a means for automatically determining, for each of the horizontal coordinates, offset coordinates of the center of the device relative to the center of the nozzle, and a means for modifying the first set of horizontal coordinates with the horizontal offset coordinates so as to produce teaching data that identifies the location of the device relative to the initial set of coordinates.

According to a further aspect of the invention, a method is provided for teaching a location in a device programming apparatus. The method typically comprises the steps of providing a device in the location to be taught, providing a nozzle capable of picking up the device, wherein the nozzle has an initial set of coordinates defined by three orthogonal axes and an initial angle coordinate defined by a first and a second one of the three axes, and positioning the nozzle to a first set of coordinates such that the nozzle is proximal the device, wherein the first set of coordinates is different from the initial coordinates along the first and second axes. The method also typically comprises the steps of automatically determining, with the nozzle, the position of the device along the third axis relative to the initial third axis coordinate, automatically determining offset coordinates of the center of the device relative to the nozzle for each of the first and second axes coordinates and the angle coordinate, and combining the offset coordinates with the first set of coordinates and the initial angle coordinate so as to determine the location and orientation of the device relative to the initial set of coordinates and initial angle coordinate.

Reference to the remaining portions of the specification, including the drawings and claims, will realize other features and advantages of the present invention.

Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1A:
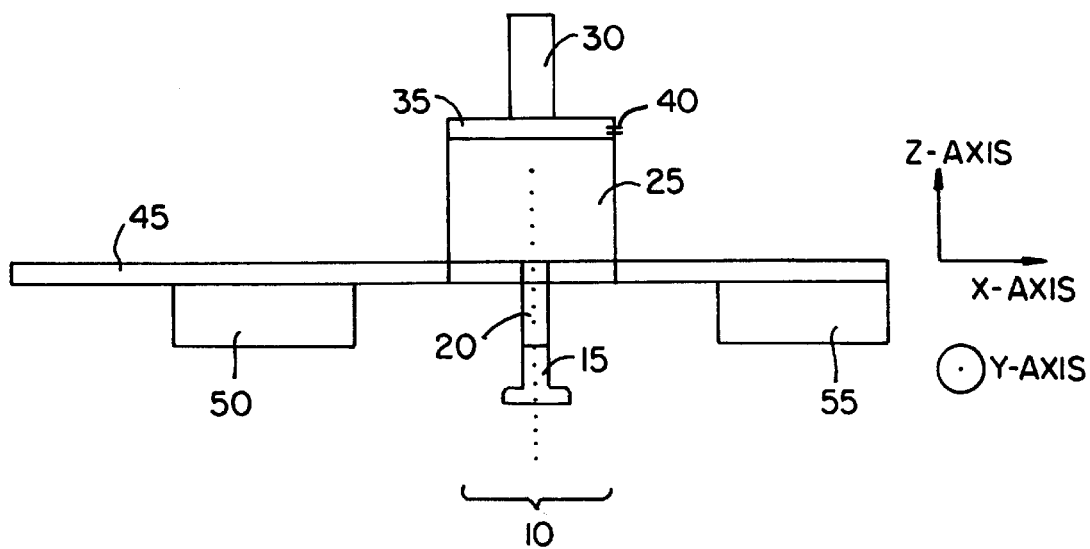
FIGS. 1a and 1b illustrate a side view and a top view, respectively, of the general hardware layout of an exemplary system for implementing the teaching techniques of the present invention.
Figure 1B:
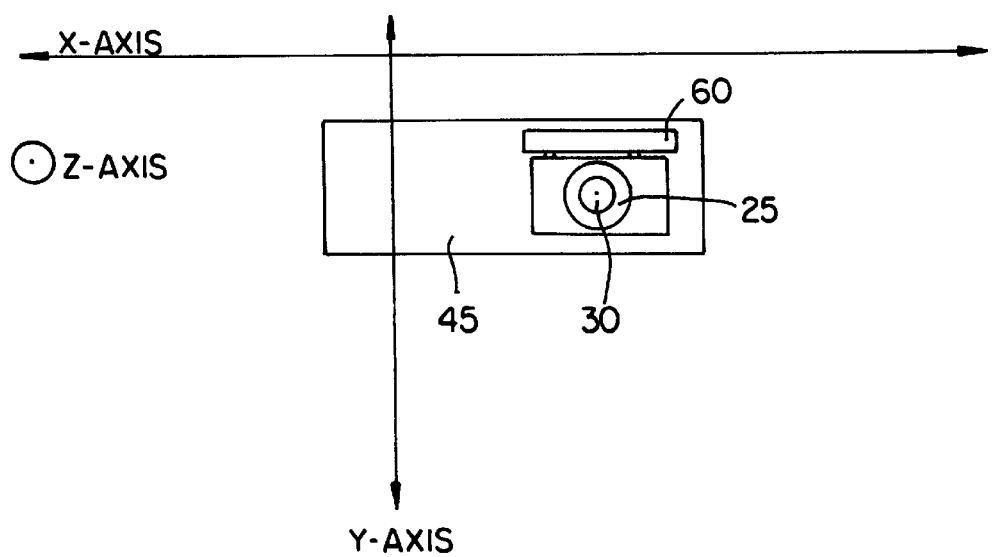

FIGS. 1a and 1b illustrate a side view and a top view, respectively, of the general hardware layout of an exemplary system for implementing the teaching techniques of the present invention. As depicted in FIGS. 1a and 1b, the preferred embodiment of the system includes a nozzle assembly 10, a base plate 45, a laser alignment system, a Z-rail tower 60 and an arrangement of bearings, motors, and supporting hardware (not shown) to allow the nozzle tip to move in all three Cartesian directions as well as rotate. Nozzle assembly 10 includes a pick and place nozzle 15 attached to a spindle 20 which is driven by an angle motor 25. Motor 25, via spindle 20, causes nozzle 15 to rotate in the horizontal X, Y plane. Motor 25 preferably rotates nozzle 15 in either direction. The laser align system includes a laser source 50 and a sensor 55 mounted to base plate 45 so that nozzle 15 is able to move a device into the laser alignment system's field of view and spin the device through any angle. Linear encoders (not shown) are provided to accurately determine position along the X and Y axes corresponding to the horizontal coordinates of the device on the system tabletop.

In one embodiment, the system also includes a laser pointer 30 coupled to nozzle assembly 10 which can shine through nozzle 15 from above to illuminate a point on the tabletop immediately below nozzle 15. In addition, pneumatic components, including accumulator 35 and vacuum port 40 allow the application of vacuum pressure to the nozzle tip to enable nozzle 15 to lift devices as is well known.

In a preferred embodiment, stepper motors (not shown) drive all four motions. In one embodiment, belts are used to convey power from the X and Y motors to the appropriate points of application, a lead screw is provided to convey power from the Z motor to move the nozzle assembly 10 in the vertical (Z) direction along Z-rail tower 60, and angle motor 25 operates in a direct drive arrangement. These stepper motors are preferably controlled by a commercial 4-axis motion control card installed in a computer system such as an ordinary desktop personal computer.

The system must initialize all four axes of motion. In preferred aspects, the X and Y axes are initialized by a built-in operation of the motion control card. Issuance of the appropriate command causes the pick and place nozzle head 15 to automatically seek the X and Y coordinates at which the home sensors are triggered. The motion control system then automatically sets the X and Y coordinates to zero at that point. Angle motor 25 can spin endlessly in either direction, and there is no preferred origin angle. Therefore, the angle coordinate is initialized by simply setting the angle coordinate stored within the motion control system to zero.

Figure 2:
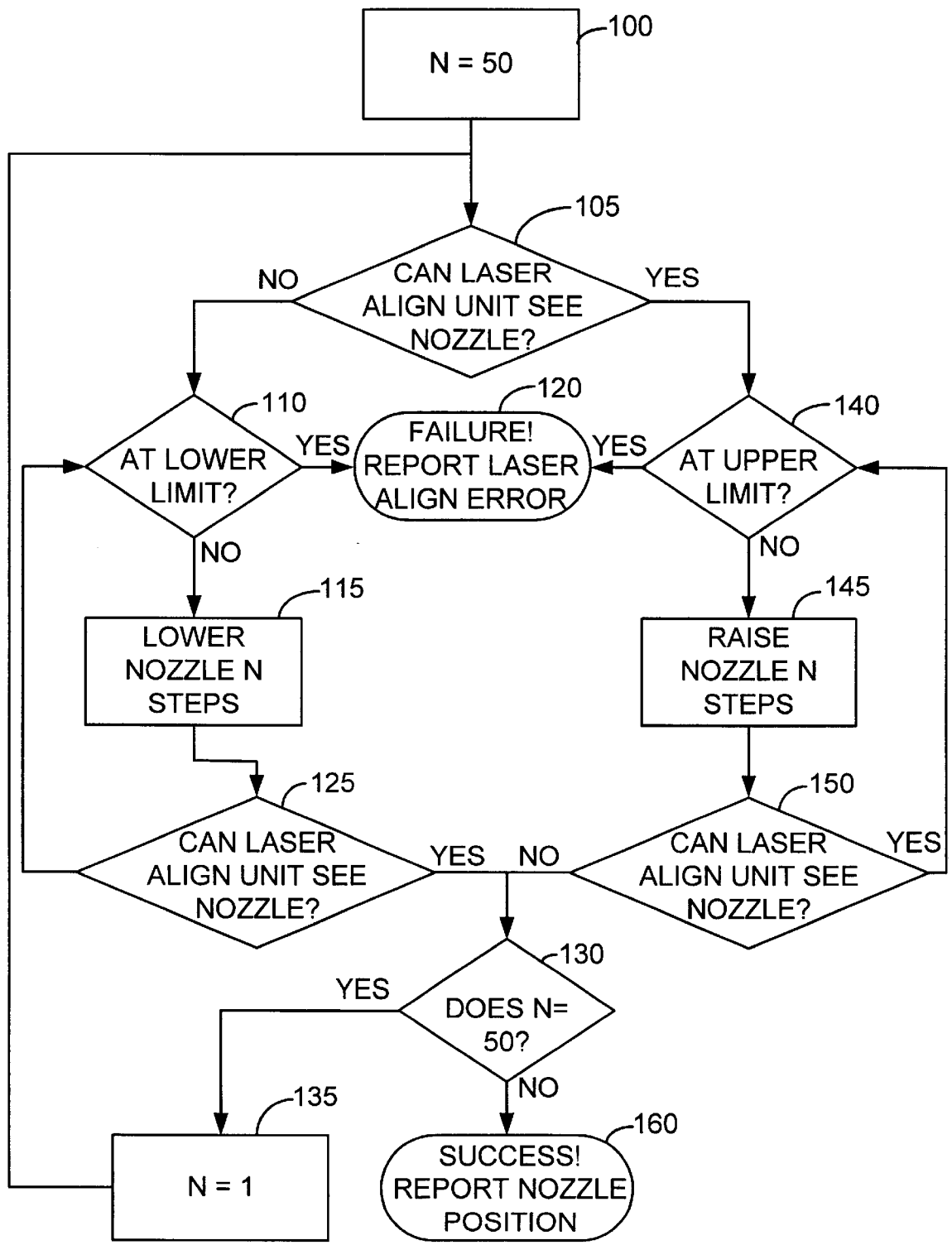
FIG. 2 is a flowchart that illustrates a process of establishing the position of Z=0 using a laser align unit according to an embodiment of the present invention.

The Z-axis initialization is described in FIG. 2. In preferred aspects, the laser align system is used to determine the Z=0 point. Z=0 is defined as that point at which the laser align unit transitions between being able to "see" nozzle 15 and being unable to see nozzle 15. That is, the position is defined such that nozzle 15 blocks the laser align beam for all positive Z and does not block the beam for all negative Z.

Briefly, the system looks for the nozzle with the laser align unit. If it can see the nozzle, it begins moving the nozzle up, for example, 50 steps at a time, until it can no longer see it. If it can't see it, it begins moving it down 50 steps at a time until it can see the nozzle. Once this process is completed, the same algorithm is repeated in steps of one in order to obtain the most accurate Z=0 coordinate.

At step 100, the step count N is set to 50. To speed the process, the initial seek operation preferably moves in vertical increments of 50 motors steps, however any number greater than 1 can be used as desired. At step 105, it is determined whether the laser alignment system can "see" nozzle 15, i.e., whether nozzle 15 is in the path of a laser beam from laser source 50 directed at sensor 55. If nozzle 15 is not seen, the system proceeds to step 110, where it is determined whether nozzle 15 is at a lower limit (i.e., cannot be lowered further by the current step count N). If it is, an error is reported in step 120 as the nozzle can not be lowered further. If it is not at the lower limit, nozzle 15 is lowered by a number of steps defined by the step count N (initially N=50) in step 115. At step 125, it is again determined whether the laser alignment system is able to see nozzle 15. If not, step 110 is repeated. If the nozzle is seen, the system proceeds to step 130. In step 130, it is determined whether the step count N is the same as the initialized step count from step 100. If so, the step count is reset to 1 in step 135 and step 105 is repeated. This allows the system to obtain the most accurate Z=0 coordinate by lowering or raising nozzle 15 by the smallest possible increment.

If it is determined at step 105 that nozzle 15 is seen, the system proceeds to step 140, where it is determined whether nozzle 15 is at an upper limit (i.e., cannot be raised further by the current step count N). If it is, an error is reported in step 120 as the nozzle can not be raised further. If it is not at the upper limit, nozzle 15 is raised by a number of steps defined by the step count N in step 145. At step 150, it is again determined whether the laser alignment system is able to see nozzle 15. If it is seen, step 140 is repeated. If the nozzle is not seen, the system proceeds to step 130 where it is determined whether the step count N is the same as the initialized step count from step 100. If so, the step count is reset to 1 in step 135 and step 105 is repeated. Again, this allows the system to obtain the most accurate Z=0 coordinate by lowering or raising nozzle 15 by the smallest possible increment. If the step count N=1, the nozzles Z position is reported as the Z=0 position at step 160.

Once all coordinates, i.e., X, Y, Z and angle have been initialized, the system proceeds to learn the location of a device. In one embodiment, the device is provided (e.g., physically placed) in the desired location to be taught by an operator of the system.

According to an embodiment of the present invention, the system is capable of identifying a particular hardware configuration (by serial numbers or any other uniquely identifying feature) and determining whether or not to invoke teaching for that combination based on the prior existence of stored teaching data. For example, in one embodiment, the system is equipped with a bar code reader for reading a bar code associated with a device. In another embodiment, the operator inputs an identifier, such as a device serial number or product number or the like. The system checks a memory to see if stored teaching data exists for the particular identified device. If not, the system proceeds to learn the location of the provided device.

Figure 3:
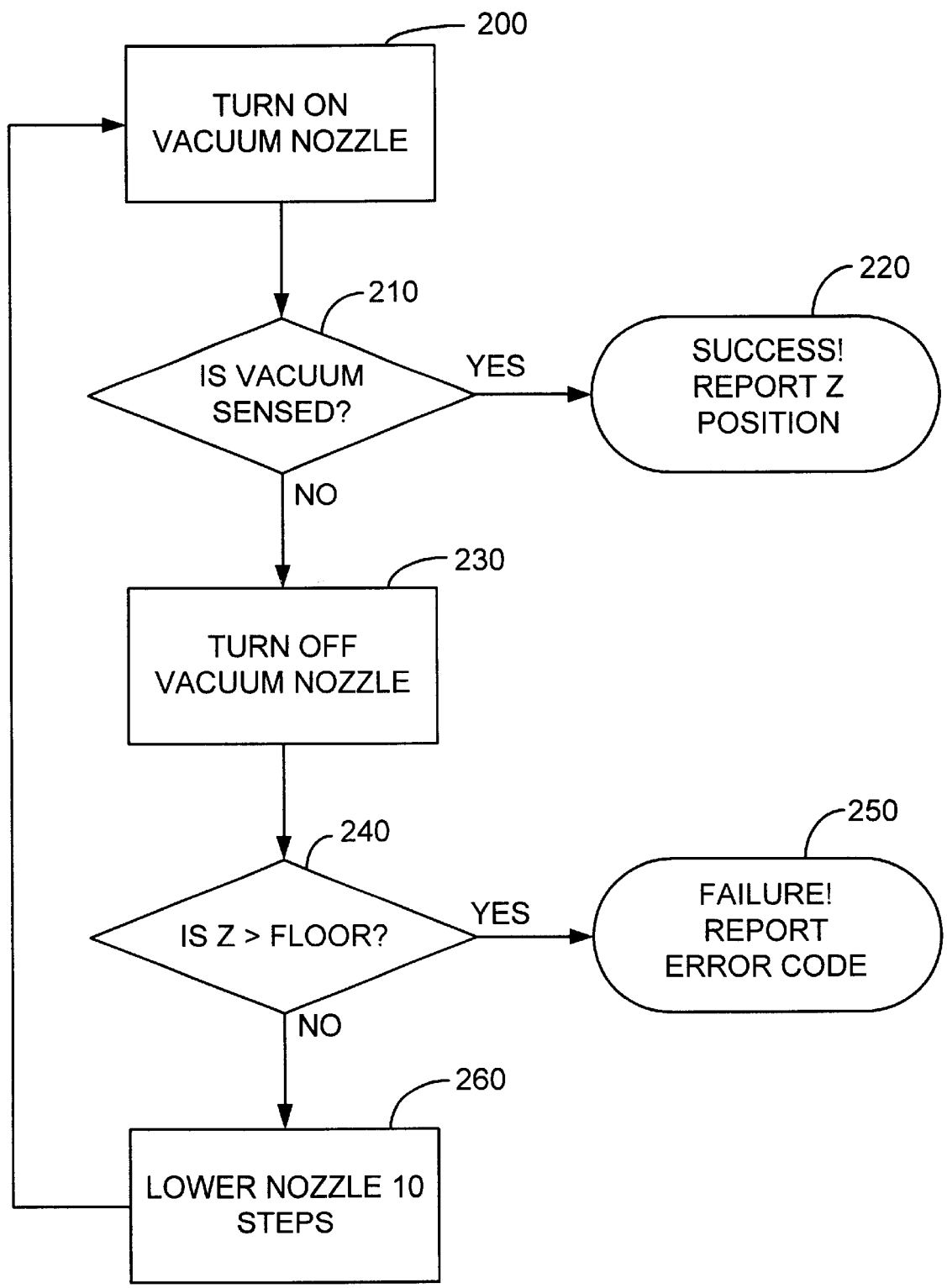
FIG. 3 is a flowchart that illustrates a process of detecting the Z-location of the surface of a device according to an embodiment of the present invention.

FIG. 3 is a flowchart that illustrates a process of detecting the Z-location of the surface of a device according to an embodiment of the present invention. The algorithm for learning the Z coordinate of a device assumes that the pick and place nozzle is above the top surface of the device. In one embodiment, laser pointer 30 is used to allow a system operator to position nozzle 15 above the device in the location to be taught. The position set by the operator does not affect the final coordinates determined by the teach process. The position must merely be close enough to allow the system to pick the part up. When the operator is satisfied with the rough location, he or she notifies the system software to indicate permission to move to the next step.

In one embodiment, the system's vacuum equipment includes a vacuum sensor which is capable of detecting whether or not the nozzle is in contact with the device while the vacuum is turned on. Briefly, starting at any Z coordinate, the algorithm proceeds by gradually lowering the nozzle. At each step the vacuum is activated and the sensor is sampled to determine whether or not the nozzle is in contact with the surface of the device.

Referring to FIG. 3, in step 200, the vacuum is turned on. At step 210, it is determined whether the vacuum is sensed, i.e., whether nozzle is in contact with the device. If a vacuum is sensed, the Z-position of the surface of the device is reported in step 220. If the vacuum is not sensed, the vacuum is turned off. In step 240, it is next determined whether the Z position is greater than a predetermined maximum descent level. In order to prevent damage to the system, a maximum descent is imposed; if nozzle 15 reaches this level without detection of a vacuum, an error is reported in step 250. If not, in step 260 the nozzle is lowered a number of steps. Nozzle 10 is preferably lowered 10 steps in step 260, however fewer or greater number of steps may be used as desired.

Figure 4:
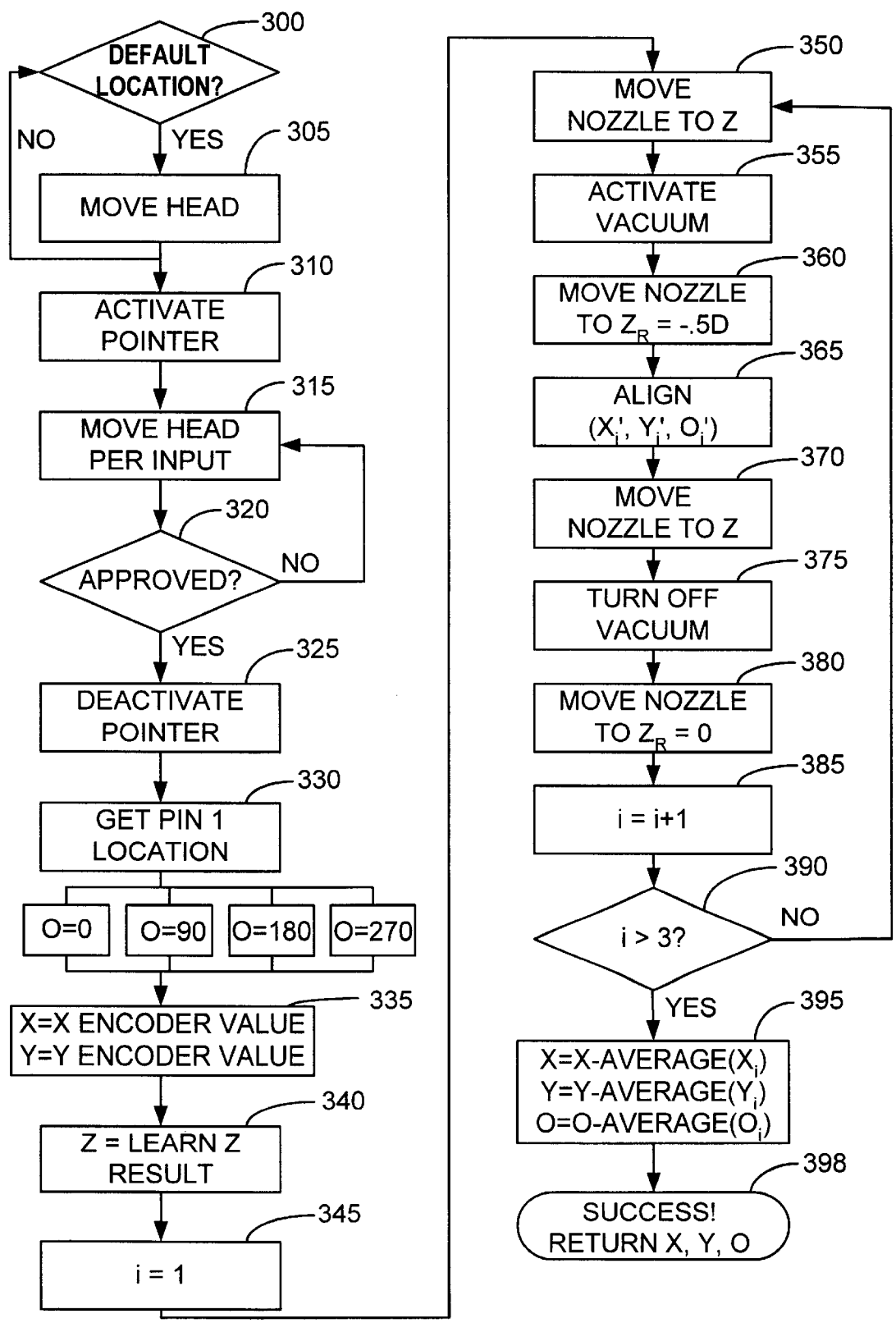
FIG. 4 is a flowchart that illustrates a process for establishing an initial estimate of a device's X, Y, and angle coordinates, and for rendering the estimate exact using an alignment process according to an embodiment of the present invention.

FIG. 4 illustrates the process of learning the X and Y coordinates of the center of the device in the location to be taught and the angle coordinate (i.e., orientation in the X–Y plane) of the device in the location to be taught. In the first step, step 300, it is determined whether or not default coordinates for the location being learned exist in the system's database. There are many ways in which this could be accomplished. In a preferred embodiment, for example, a serial number is read from the piece of equipment (device) that presents the location. If this serial number appears in the database, then the default coordinates are read from the corresponding disk file. If this serial number doesn't appear in the database, there are no default coordinates associated with the location. If default coordinates do exist, in step 305 the pick and place nozzle head is moved to those coordinates before the algorithm proceeds.

The next step of the process is to offer the user an opportunity to set or correct the location coordinates. In many cases where default coordinates exist, no correction is required as the default coordinates are typically close enough to allow the self-teaching process to determine necessary corrections. In a preferred embodiment, in step 310 laser pointing device 30 is activated and a laser beam is directed through the shaft of the spindle 20 and along the angle axis defined thereby. The laser beam illuminates a point on the tabletop immediately below nozzle 15. This approach makes it extremely easy for the user to position the pick and place head appropriately. The user may either move the pick and place nozzle head by hand or use user interface controls to move the head to the precise location required in step 315.

When the head is in the proper position, the user indicates this fact in step 320 by triggering a user interface control (e.g., pointing the cursor at a particular control and clicking the mouse). Laser pointer 30 is deactivated in step 325. In step 330, to determine the initial value of angle, the user activates a control which specifies the location of pin one of the programmable device. For example, in one embodiment, if pin one is in the front left corner or in the center of the left side of the device (viewed from the front of the machine), the estimated angle is defined as zero. If pin one is in the front right corner or in the center of the front side of the device, the angle is initialized to 90 degrees, and so on. Four initial angles (0, 90, 180, and 270 degrees) are possible. The system then reads the current value of the X and Y encoder devices in step 335, which sets the initial (uncorrected) X and Y coordinates of the device location being taught. In step 340, the system learns the Z-coordinate of the surface of the device in the location being taught, for example using the process as shown in FIG. 3.

Figure 5A:
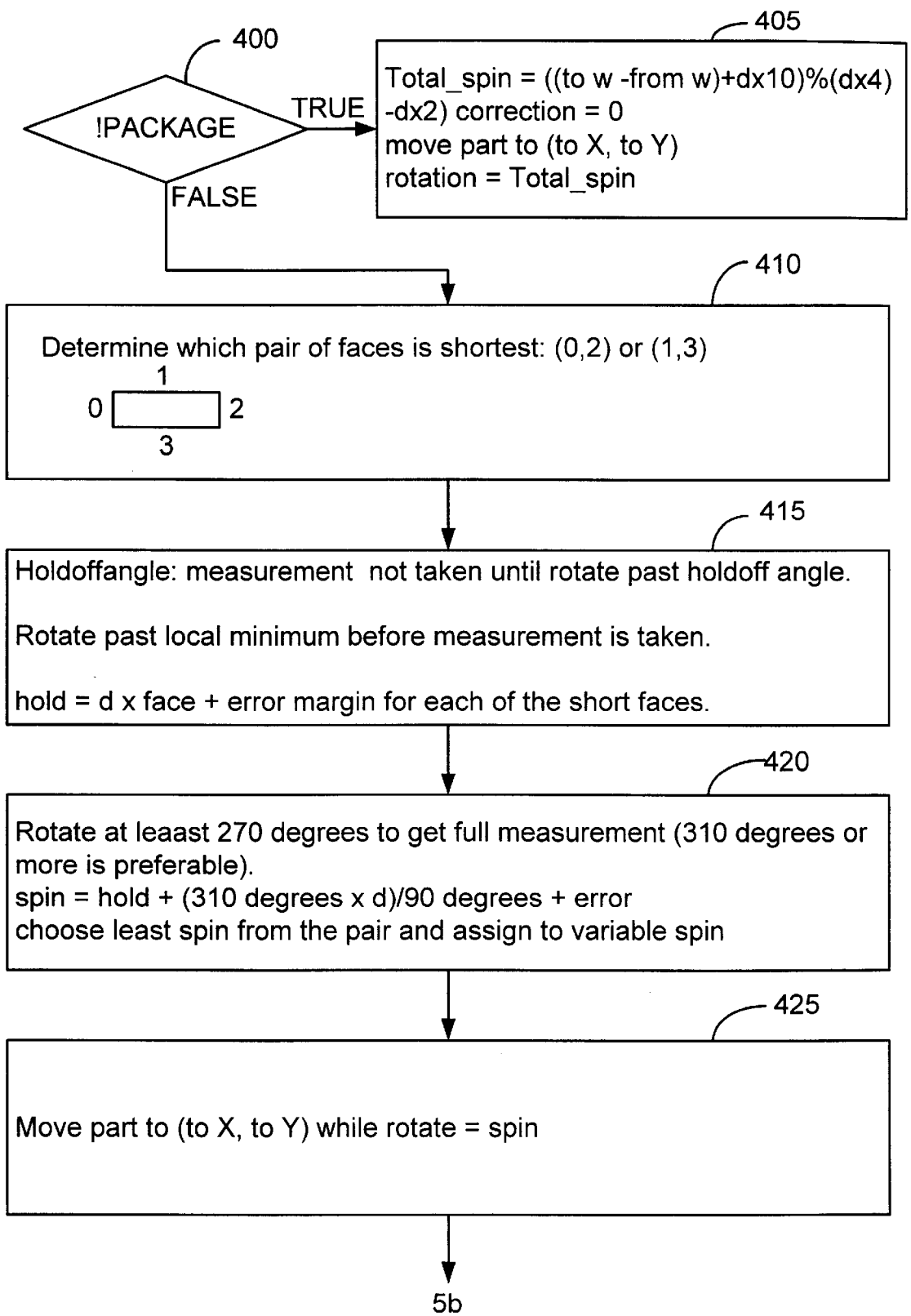
FIGS. 5a and 5b are flowcharts that illustrate an alignment process according to an embodiment of the present invention.
Figure 5B:
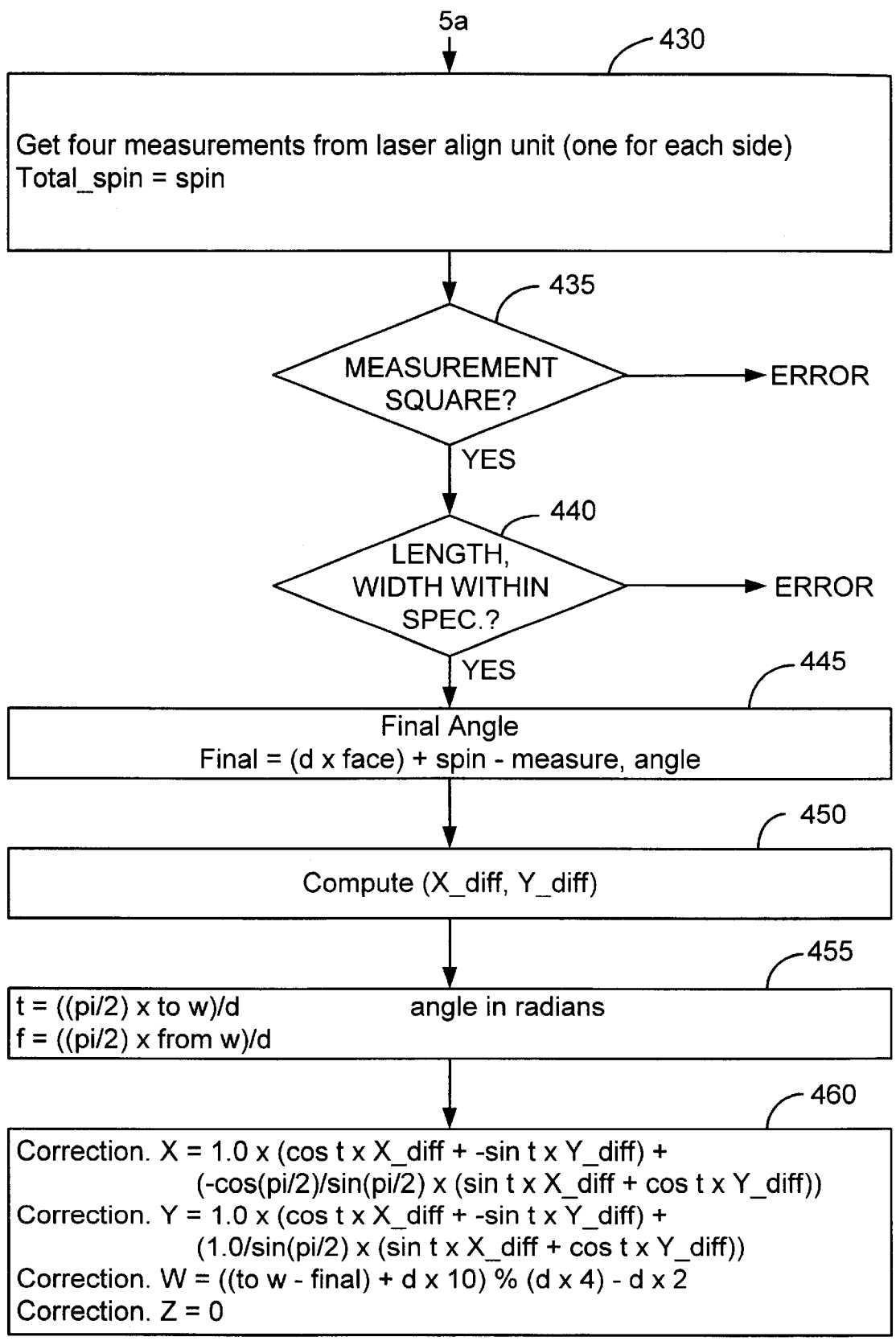

Once initial estimates are made and nozzle 15 is over the target device, a counter is set in step 345, and nozzle 15 is then lowered to the device surface and the vacuum is used to lift the device in front of the laser align unit. Specifically, in step 350, nozzle 15 is moved to the Z-coordinate of the surface of the device, and the vacuum is activated in step 355. In step 360, the nozzle is moved so that the device is within the field of view of the laser align system. For example, in one embodiment, nozzle 15 is moved to a z position roughly equal to half of the thickness of the device. In step 365, an align routine is used to determine the distance from the center of the device to the center of its rotation (i.e., the center of nozzle 15) in X and Y, and to determine the angle between the device and the system's X axis. An embodiment of an align process is illustrated in FIGS. 5a and 5b and will be described in more detail below. Briefly, the laser align unit takes measurements as the device is rotated. For example, one or more sensors monitor which of one or more laser beams is interrupted during a rotation of the device. At any given time the image can be characterized by a width and a center position. The laser align unit identifies the four positions (corresponding to the four sides of the device) at which the image exhibits local width minima, and returns the center position associated with each of the four positions. Using these four center coordinates, the software is able to compute a correcting move for the X, Y and angle coordinates.

Once the laser align unit has taken measurements and determined necessary X, Y and angle corrections, the device is placed back in the location to be taught. Specifically, in step 370, the nozzle is lowered to the stored Z-coordinate of the surface of the device when in the location being taught. In step 375, the vacuum is turned off, and in step 380, the nozzle is raised to the initial Z=0 position. According to a preferred embodiment, the alignment process is repeated three times, and the results are averaged to get a better estimate of the error associated with the initial coordinate estimates. According to this embodiment, the counter is increased by one in step 385, and in step 390 it is determined whether the counter is greater than three. If not, indicating that the alignment process has not been repeated three times, steps 350 through 385 are repeated.

If the align process has been repeated three times, the system proceeds to step 395, where the corrected X, Y and angle coordinates are determined. The nature of the align routine is such that the results (e.g., averages) of the routine can be subtracted from the initial coordinates in order to generate the corrected coordinates. After this process is complete, the corrected coordinates are returned to the calling routine for storage in the default coordinate database in step 398.

FIGS. 5a and 5b are flowcharts that illustrate an alignment process according to an embodiment of the present invention. In step 400 it is determined whether X, Y, Z and angle information needs to be taught, or whether only Z information needs to be taught. Referring to FIG. 5a, !Package is a flag, which in a preferred embodiment, if non-null indicates that X, Y, Z and angle information needs to be taught, and provides information about the device under test that is necessary for this process. If the package pointer is null, only Z-coordinate information need be taught, and in step 405, the known coordinate information is provided. In step 410, the system determines which pair of opposite faces is shortest. In step 415, after determining which pair of faces is shortest, the system determines how far it is necessary to rotate the part from its starting position to guarantee that, if measurement is started at that point, the shadow cast by the part on the laser align sensor will decrease to a minimum corresponding to the short face. This process guarantees that the sensor doesn't inadvertently detect the shadow minimum corresponding to the long dimension of the device under test.

In step 420, the system rotates the device by at least 270 degrees to get a full alignment measurement. In one embodiment, in step 420 a spin angle is computed that accounts for any error in the assumed initial angle of the part. Preferably, the spin angle computation is accomplished as follows:

1. Rotate through the holdoff angle calculated in step 415;
2. Rotate further until a shadow minimum width (short dimension) is detected;
3. Rotate 270 degrees more to detect three more shadows (e.g., long, short long); and
4. Rotate an additional small amount for "buffer". In preferred aspects, the system rotates the device by at least 310 degrees.

In step 425, the part is moved to the coordinates X, Y and the device is rotated. In preferred aspects, the device is rotated through an angle equal to spin as determined in the previous step. In step 430, four measurements are obtained, one for each side of the device.

In step 435, it is determined whether the measurements taken are square, e.g., if face 0=face 2, and if face 1=face 3. If not, an error is returned. If the measurements are square, it is determined in step 440 whether the length (longest face) and width (shortest face) are within proper specifications. An error is returned if the measurements are not within the defined range of values. In step 445, the final angle is determined. In one embodiment, the computed angle includes three components:

1. The laser align result (e.g., the actual initial angle modulo 90 degrees).
2. "d * face" is "90 * face". This corrects for the modulo operation.
3. The total spin (e.g., a measure from the initial angle to the final angle).

In step 450, the difference in both X and Y coordinates of the center of the device relative to the nozzle are determined. In general, the laser align process makes four measurements of the center location of the component shadow, each taken 90 degrees apart (e.g., corresponding to the four sides labeled in step 410). Measurements 0 and 2 are the same if the nozzle is perfectly centered along the long dimension. Measurements 1 and 3 are the same if the nozzle is perfectly centered along the short dimension. If the nozzle is not centered along one or the other dimension, one of the center measurements increases by the error amount, while the opposing measurement decreases. Thus, in one embodiment, the difference in the two measurements for both the short and long dimensions are taken and divided by 2 to obtain the nozzle offset relative to the center of the device.

In step 455, the parameter t is determined. The angles to_w and from_w are multiples of 90 degrees, which makes the sines and cosines of those angles 1, 0, or −1. These values alter the signs of X_diff and Y_diff appropriately to make the calculations generic for all cases. According to an alternative, a switch statement is used and almost identical equations are used in all four sections. In step 460 the correction values for the X, Y and angle coordinates are determined using the parameter t from step 455.

It will be apparent to one skilled in the art that the techniques of the present invention are particularly useful in an apparatus for programming a variety of types of programmable devices and programmable integrated circuit devices (PICs), including for example, flash memories, EEPROMs, microcontrollers, PLDs, PALs, FPGAs and the like.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although the location of only one device is taught in the above description, linear interpolation of multiple measured device coordinates can be used to compute the coordinates of a large number of identical devices located along with the measured devices in a matrix arrangement. Therefore, the scope of the appended claims should be accorded the broadest interpretation so as to encompass all such modifications and similar arrangements.

What is claimed is:

1. A method of teaching a location in a device programming apparatus, the method comprising the steps of:

providing a device in the location to be taught;

providing a nozzle capable of picking up the device, wherein the nozzle has an initial set of horizontal coordinates and an initial vertical coordinate;

positioning the nozzle to a first set of horizontal coordinates different from the initial set of horizontal coordinates such that the nozzle is above the device;

automatically determining, with the nozzle, the vertical position of the device relative to the initial vertical coordinate;

storing the vertical position such that in the future, the nozzle is moved to the vertical position stored to pick or place the device;

automatically determining, for each of the horizontal coordinates, offset coordinates of the center of the device relative to the nozzle;

combining the horizontal offset coordinates with the first set of horizontal coordinates so as to determine the location of the device relative to the initial set of horizontal coordinates;

repeating the step of determining the horizontal offset coordinates two or more times; and determining an average offset coordinate for each of the horizontal coordinates, wherein in the step of combining, the average offset coordinates are combined with the first set of horizontal coordinates.

2. The method of claim 1, wherein automatically determining the horizontal offset coordinates includes:

picking up the device with the nozzle;

rotating the device in the field of view of a laser align unit, the laser align unit having one or more laser sources each emitting one or more laser beams, and one or more sensors; and detecting, with the one or more sensors, which of the one or more laser beams is interrupted during rotation of the device.

3. The method of claim 1, wherein automatically determining the vertical position of the device includes:

gradually lowering the nozzle towards the device; and sensing when the nozzle is in contact with the device.

4. The method of claim 1, wherein positioning the nozzle to the first set of horizontal coordinates includes:

reading an identifier on the device, wherein the identifier is associated with coordinates stored in a memory;

accessing the memory to determine the stored coordinates associated with the identifier; and automatically moving the nozzle to the stored coordinates.

5. The method of claim 1, wherein positioning the nozzle to the first set of horizontal coordinates includes:

receiving user input indicative of the first set of horizontal coordinates;

and moving the nozzle in response to the user input.

6. The method of claim 1, wherein the initial set of horizontal coordinates include an X coordinate, a Y coordinate and an angle coordinate.

7. The method of claim 6, wherein the horizontal offset coordinates include an X correction value, a Y correction value and an angle correction value, such that combining the horizontal offset coordinates with the first set of horizontal coordinates precisely determines the location of the center of the device and the orientation of the device relative to tie initial set of coordinates.

8. A method by a device programming apparatus for obtaining and storing location information for a device, the method comprising:

(a) providing a first device at a first target location;

(b) determining a first location information for the first target location, wherein the first location information comprises coordinates of the first target location relative to a nozzle location, the nozzle for picking up the first device;

(c) providing a first identifier for identifying the first device and the first location information;

(d) storing the first location information in a non-volatile memory;

(e) providing a second device at a second target location;

(f) determining whether location information for the second target location is stored by comparing a second identifier for identifying the second device with the first identifier;

(g) if so, retrieving the first location information for use by the nozzle; and (h) if the second identifier does not correspond to the first identifier, repeating acts (b)–(d) for the second device at the second target location.

9. The method of claim 8 wherein the first identifier is a serial number.

10. The method of claim 8 wherein the first identifier is a product number.

11. The method of claim 8 wherein the nozzle has an initial set of horizontal coordinates and an initial vertical coordinate, and act (b) further comprises:

positioning the nozzle to a first set of horizontal coordinates different from initial set of horizontal coordinates such that the nozzle is above the first device;

automatically determining, with the nozzle, the vertical position of the first device relative to the initial vertical coordinate;

automatically determining, for each of the horizontal coordinates, offset coordinates of the center of the device relative to the nozzle; and combining the horizontal offset coordinates with the first set of horizontal coordinates to produce the first location information that identifies the location of the first device relative to the initial set of coordinates.

* * * * *